United States Patent
De Groot

[15] 3,651,749
[45] Mar. 28, 1972

[54] EXPOSURE CONTROL APPARATUS
[72] Inventor: Gerald H. De Groot, Rochester, N.Y.
[73] Assignee: Eastman Kodak Company, Rochester, N.Y.
[22] Filed: Oct. 1, 1970
[21] Appl. No.: 77,077

[52] U.S. Cl. ............................ 95/64 D, 95/10 C, 250/237 R, 352/141
[51] Int. Cl. .................... G03b 7/10, G03b 19/18, G01j 1/44
[58] Field of Search ................ 95/10 C, 64 R, 64 D; 352/141; 250/217 R, 237 R

[56] References Cited

UNITED STATES PATENTS

| | | |
|---|---|---|
| 3,500,730 | 3/1970 | Matsubara et al. ................ 95/10 C |
| 2,999,443 | 9/1961 | Miyauchi ........................... 95/10 C |
| 2,058,562 | 10/1936 | Bucky et al. ...................... 95/10 L |

*Primary Examiner*—Joseph F. Peters, Jr.
*Attorney*—Robert W. Hampton and Raymond L. Owens

[57] ABSTRACT

An automatic exposure control apparatus is disclosed which includes a compensating filter which is movable between a first position wherein it is disposed in optical alignment with the camera lens to adjust the color balance of incident ambient light available for exposure and a second position wherein it is withdrawn from alignment with the camera lens; a photocell which produces a discernable output signal in response to artificial lighting having substantial components in the infrared portion of the light spectrum; and an electrically actuable device coupled to the compensating filter and adapted to move the compensating filter to the second position out of alignment with the camera lens in response to the signal.

2 Claims, 1 Drawing Figure

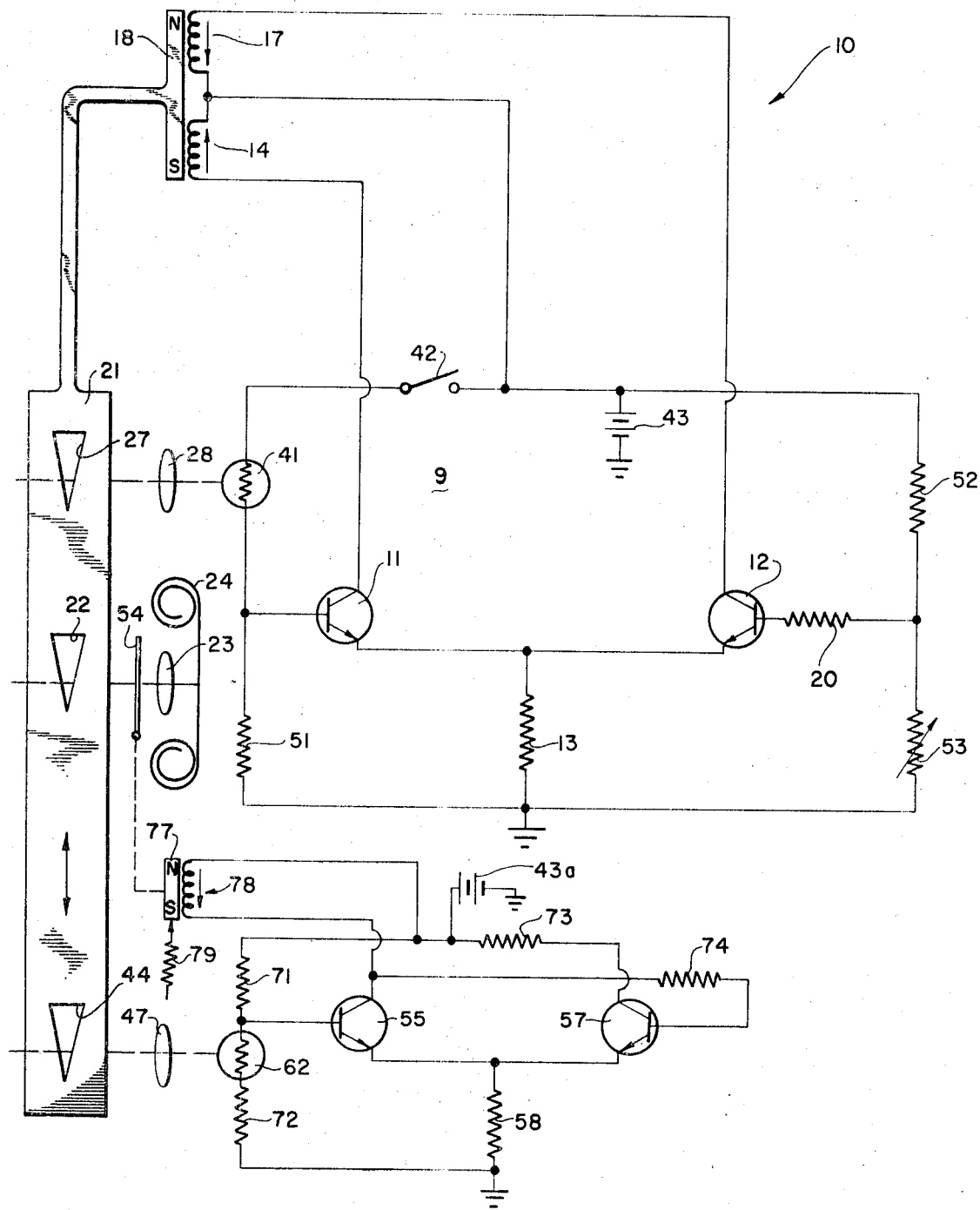

EXPOSURE CONTROL APPARATUS

CROSS-REFERENCES TO RELATED APPLICATIONS

Reference is made to commonly assigned copending U.S. Pat. application Ser. No. 84,389, entitled "Self-Balancing Apparatus for Photographic Cameras" filed Oct. 27, 1970 in the names of David L. Babcock and David B. Lederer.

BACKGROUND OF THE INVENTION

The present invention relates to apparatus which move filters into and out of alignment with the objective lens of a camera to vary the intensity and color balance of light available for exposure.

Many cartridge loading cameras having automatic exposure control systems are provided with a light balancing lens filter which, when placed in optical alignment with the camera objective lens, produces proper exposure of Type A color film in sunlight. This filter is commonly referred to as a Type A lens filter and is adapted to permit the exposure parameters of Type A and daylight film to be identical when both are exposed in sunlight. When using Type A color film and artificial lighting is employed, the filter should, of course, be removed from alignment with the camera objective lens. The removal of the filter has heretofore been accomplished by inserting an artificial light attachment (or key, when a remote light source is used) in a camera receptacle having means therein for displacing such filter. When employing a camera indoors under artificial lighting, insertion of an artificial light key may be overlooked resulting in improperly exposed film.

BRIEF DESCRIPTION OF THE DRAWING

In the detailed description of the preferred embodiment of the invention presented below, reference is made to the accompanying drawing which is a schematic diagram of an exemplary exposure control circuit in accordance with the invention.

BRIEF DESCRIPTION OF THE PREFERRED EMBODIMENT

In accordance with a disclosed embodiment of the invention, a self-balancing automatic exposure control apparatus includes a diaphragm adapted to adjust the size of three apertures adapted to respectively admit light to (1) a first photocell lens, (2) the camera objective lens for suitable film exposure and (3) a second photocell which is adapted to provide a discernable output signal in response to light having a high level of infrared components. The apparatus includes a control circuit which in response to the signal is adapted to withdraw a compensating light filter from a position wherein it was optically aligned with the objective lens.

DETAILED DESCRIPTION OF THE INVENTION

Exposure control apparatus embodying the invention may be employed in cameras of either the still or motion picture variety. Since such cameras are well known, the present description will be directed in particular to elements forming part of, or cooperating more directly with apparatus in accordance with the present invention. It will be understood that parts not specifically shown or described are selectable from those known in the art.

Turning now to the drawing, there is shown an exposure control apparatus 10 which includes a self-balancing control circuitry 9 having a differential amplifier configuration. The circuitry 9 is magnetically coupled to a core member 18 by means of a "close" winding 14 and an "open" winding 17. The magnetic core member 18 is moved in a downward direction when open winding 17 is energized, as subsequently described, and is moved in an upward direction when close winding 14 is energized. The core member 18 is mechanically coupled to a diaphragm 21 which as shown may take the form of an elongated plate whereby the diaphragm 21 is moved by the magnetic core member 18 in a direction, and to an extent, directly related to the movement of the core 18.

The diaphragm 21 is provided with an aperture 22 through which scene light passes to a camera or objective lens 23 to a film 24, an aperture 27 through which scene light passes by way of a lens 28 to a photosensitive device 41 and an aperture 44 through which scene light passes to a lens 47 from an aperture 44. The lens 47 is adapted to project light to a photocell 62 described more fully later in this specification. The photosensitive device 41, such as a photocell is selected from a class in which a parameter, such as resistance varies inversely with the intensity level of illumination incident thereon. The photocell 41 advantageously may be a cadmium sulfide cell which is characterized by the property that it is most responsive to light in the visible portion of the spectrum, whereas the photocell 62 also has a variable voltage parameter and advantageously is a silicon cell (a photovoltiac device) which is most responsive to infrared light which characterizes artificial lighting conditions used in taking motion pictures indoors.

The exposure control apparatus 10 is adapted to move the diaphragm 21 back and forth in accordance with variations in scene brightness to maintain a selected level of illumination on the photocell 41. In operation, as the intensity of the scene brightness diminishes, the diaphragm 21 moves downward and the light transmitted to each of the lenses 23, 28, and 47 will be gradually decreased. The decreased light projected to the photocell 41 enables the control circuit 9 to produce a null balance condition.

The control circuitry 9 for the apparatus 10 may take various forms known in the art. The circuit disclosed in commonly assigned U.S. Pat. No. 3,427,941 in the name of Lenard M. Metzger is especially suitable for use with the invention as is the circuit described in commonly assigned copending U.S. Pat. application Ser. No. 66,642 entitled ELECTROMAGNETIC AUTOMATIC APERTURE CONTROL UTILIZING A VELOCITY SENSING WINDING TO PROVIDE ACTIVE FEEDBACK VISCOUS DAMPING, in the name of Carter et al. To operate the circuit, a switch 42 is closed which connects a battery 43 into the control circuit 10. Two NPN-transistors 11 and 12 are disposed in a differential amplifier configuration which have their emitter electrodes connected to ground through a common resistance 13. The "close" winding 14 is connected as a series element in the base collector circuit of the transistor 11, and the "open" winding 17 is similarly connected as a series element in the base collector circuit of the transistor 12. The windings 14 and 17, respectively, are oppositely wound so that when energized, they will exert opposite forces on the magnetic core member 18 as indicated by the arrows in the drawing.

The differential amplifier is controlled by a resistance bridge having two arms defined by the photocell 41 and resistance element 51 respectively and the two arms defined by resistance elements 52 and 53, respectively. The bridge is balanced when illumination incident on the photocell 41 is such that the ratio or the resistance value of photosensitive device 41 to the resistance of element 51 is substantially equal to the ratio of the resistance values of the elements 52 and 53. In such condition, equal currents will pass through drive coils 14 and 17. Thus, there will be no net force tending to move the core member 18 which will be in an arrested condition. The system is calibrated such as by adjustment of the values of resistors 51 and 53 so that the bridge will be balanced when the amount of light transmitted to the lens 23 is of the desired magnitude for exposing the film 24. Thus, the predetermined resistance value of the photosensitive device 41 corresponds to a desired exposure setting.

If the ambient light drops below a previous level where the circuit 10 was balanced, the resistance of the photosensitive device 41 will increase thereby increasing the ratio of resistance values of elements 41 and 51 to a magnitude greater than that of elements 52 and 53 and cause the amplifier to supply additional energizing current to drive coil 17; this is effective, in turn, to cause movement of the diaphragm 21 in a "down" direction. The open winding 17 will be energized from a path leading from the battery 43, the winding 17, the collector-emitter path of transistor 11, and the resistor 13 to ground. This downward movement of diaphragm 21 is effective to "open" apertures 22, 27, and 44 increasing the amount of light respectively supplied by these apertures. The light supplied to the photocell 41 will increase until a balanced condition for the circuit 9 is again reached.

Conversely, under conditions when the amount of light reaching photocell 41 and film 24 is greater than the previously established ideal magnitude for good quality pictures, the ratio of the resistance values of the elements 41 and 51 will then be less than the ratio of the resistance values of the elements 52 and 53 and the amplifier will then function to supply additional energizing current to drive coil 14 moving the diaphragm 21 in an upward direction. Movement in this direction will be effective to "close" apertures 22, 27, and 44. Here, the light supplied to the photocell 41 will decrease until a balanced condition is reached.

An illustrated first position wherein it is disposed in accordance with the invention a compensating light filter 54 is movable between the light path of the objective lens 23 and a second position wherein the filter is withdrawn from optical alignment with the lens 23. The filter which may be a so-called Type A filter, a type commonly used when home movies are being taken and its use has proven effective in obtaining pictures of superior quality. The filter should be used only under lighting conditions which approximate daylight illumination and not when bright intensity artificially produced light is being used such as produced by a tungsten filament element. This light is predominately infrared as compared to the predominately ultraviolet daylight illumination.

The circuit for controlling the position of light filter 54 in relation to objective lens 23 includes Schmitt trigger type circuit comprising a battery 43a, NPN-transistors 55 and 57 coupled to have their emitter electrodes connected through a common resistor 58 to ground and a coil 78 disposed in the electrical path between the battery 43a and the collector electrode of the transistor 55. The silicon photocell 62 is connected in one arm of the circuit in series with the battery 43a, a fixed resistive element 71 and variable resistive element 72. The base electrode of the transistor 55 is electrically connected to the junction of the elements 62 and 71. Another fixed resistance element 73 is disposed in another branch of the circuit in the electrical path between the battery 43a and the collector electrode of the transistor 57. Finally, a biasing resistor 74 connects the base electrode of transistor 57 to the collector electrode of the transistor 55.

As indicated by the dotted line, the compensating filter 54 is mechanically coupled to, and its movement directly related to movement of the magnetic core member 77 which, in turn, is moved in a downward direction by coil 78 when the coil is energized. Such downward movement is effective to withdraw the filter 54 from the light path of objective lens 23; a biasing spring 79 or other suitable means provides the means for maintaining the filter 54 in the illustrated position aligned with the objective lens 23 under normal lighting condition.

Under conditions of ambient illumination, the effective voltage produced by the photocell 62 does not change materially and the circuit remains in its quiescent condition with transistor 55 OFF and transistor 57 ON. In order to insure that the coil 78 will not be energized by ambient scene light, the aperture 44 is adapted to control the effective ambient of light which passes to the photocell 62. Thus, with increasing scene brightness, the effective size of the aperture 44 will decrease, and conversely, with decreasing scene brightness, it will increase. Under either of these conditions, the arrangement is such that the photocell output will be maintained at a relatively constant value (viz its variable voltage parameter will be returned to a predetermined value selected so that the transistor 55 will be OFF while the transistor 57 is ON). Variable resistance element 72 provides a means for calibrating the condition when the transistor 55 will be turned on as now will be described. Notwithstanding the effective size of the aperture 44, if we now assume that a light intensity tungsten lamp is used, the silicon cell 62 will be subjected to illumination having a high degree of infrared components. The cell is adapted to respond to a high degree to the infrared illumination and its effective voltage in the circuit is substantially increased. Under this condition, the transistor 55 is switched ON and a path is closed for energizing coil 78 from the battery 43a, the winding 78, the collector-emitter path of transistor 55, and the resistor 58 to ground. Energized coil 78 is effective to exert a force upon the core 77 which moves magnetic core 77 in a downward direction and the light filter 54 is withdrawn from its position in line with objective lens 42 for the duration of the artificial illumination.

When the artificial illumination is extinguished and the voltage developed by the cell 62 drops, the circuit is restored to its normal condition with the transistor 55 OFF and the winding 78 energized. The compensating filter 54 is also restored to its normal position for ambient illumination by the spring 79 referred to above.

Therefore, the present invention provides simple means whereby a compensating filter is automatically withdrawn from a position of optical alignment with the objective lens when artificial light is being used. Thus, there is no chance of the filter manipulation being overlooked.

The invention has been described in detail with particular reference to a preferred embodiment thereof, but it will be understood that variations and modifications can be effected within the spirit and scope of the invention.

I claim:

1. In a camera having an objective lens which is adapted to focus an image of an object in a film plane, the combination comprising:
    a. first photosensitive means having an electrical parameter, the magnitude of which varies as a function of scene illumination and which is primarily responsive to light in the visual portion of the light spectrum;
    b. second photosensitive means having an electrical parameter, the magnitude of which varies as a function of scene illumination and which is primarily responsive to light in the infrared portion of the light spectrum;
    c. diaphragm means defining a first aperture cooperatively disposed with respect to the objective lens, a second aperture cooperatively disposed with respect to said first photosensitive means, and a third aperture cooperatively disposed with respect to said second photosensitive means, said diaphragm means being movable along a predetermined path to increase the effective size of (1) said first aperture relative to the objective lens, (2) second aperture relative to said first photosensitive means, and (3) said third aperture relative to said second photosensitive means;
    d. means coupled to said diaphragm means and responsive to variations in the magnitude of the parameter of said first photosensitive means to move said diaphragm means along said predetermined path;
    e. a movable compensating filter movable between a first position wherein it is disposed in optical alignment with said first aperture and a second position wherein it is withdrawn from alignment with said first aperture; and
    f. means coupled to said filter and responsive to variations in the magnitude of the electrical parameter of said second photosensitive means indicating a scene illumination having substantial components in the infrared portion of the light spectrum to move said filter from said first position to said second position.

2. The invention as set forth in claim 1 wherein said second parameter responsive means includes a magnetic member coupled to said filter, a winding magnetically coupled to said magnetic member and effective when energized to exert an unbalanced force on said member to move said filter; a Schmitt trigger circuit electrically coupled to said winding and said second photosensitive means and adapted to be responsive to variations in said second photosensitive parameter from a predetermined value to energize said winding to exert a force on said magnetic member to move said filter out of alignment with the objective lens.